Sept. 2, 1941.　　　F. J. HARLOW　　　2,254,572
PROCESS FOR THE PRODUCTION OF CARBON BLACK
Filed March 31, 1939　　　2 Sheets-Sheet 1

INVENTOR
FRED J. HARLOW

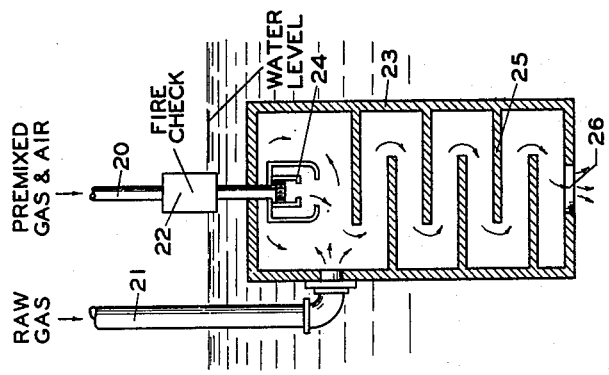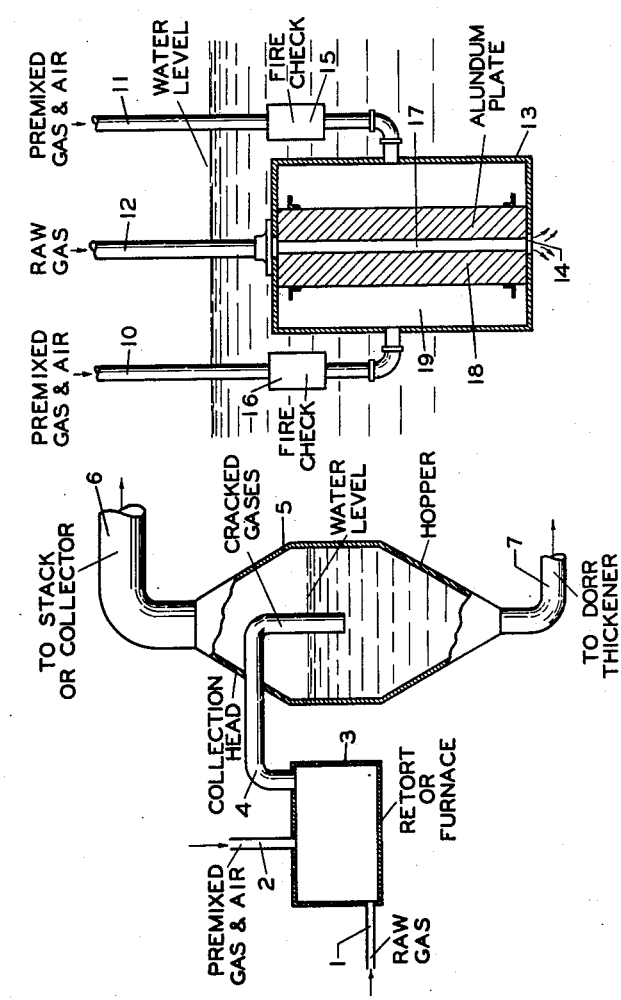

Patented Sept. 2, 1941

2,254,572

UNITED STATES PATENT OFFICE 2,254,572

PROCESS FOR THE PRODUCTION OF CARBON BLACK

Frederick J. Harlow, Bartlesville, Okla., assignor to Phillips Petroleum Company, a corporation of Delaware Application March 31, 1939, Serial No. 265,349

2 Claims. (Cl. 23—209.8)

This invention relates to a new and useful process for the production of chemical carbon black and other chemical compounds.

At the present time commercial carbon is made by four different and distinct processes, namely:

1. The channel method of producing carbon black wherein the gas is incompletely burned in houses having contact surfaces known as channels upon which the carbon black is precipitated by sudden chilling of the flame which impinges upon these relatively cold channels.

2. The cylinder process is approximately the same as the channel method with the exception that the flame impinges on a rotating cylinder and the carbon black is automatically scraped off.

3. The partial combustion ("Gastex") method produces carbon by partial combustion, cooling and precipitation electrically.

4. Carbon is produced in the cracking ("Thermatomic") method by bringing raw material or other gases in contact with incandescent refractories in a regenerative type furnace where the refractories are heated in one furnace for a definite length of time after which the heating gas is shifted over to another furnace and raw natural or other gases are passed through and come in contact with the incandescent refractories, thereby cracking the gas and producing a mixture of carbon black and residual gases. The gases are then either cooled in a conductor pipe by induction and radiation and further cooled in a spray tower after which they are passed through a conventional bag collector.

The methods above set forth differ in the amount of yield from a given quantity of gas, the particle structures are different and the intensity of color differs. The uses to which the black can be placed are different, with the higher yield processes being less adaptable to rubber tire manufacture than the lesser yields. The desired situation is to find a process which gives a high yield of carbon from the gas used, at the same time making a product which will reinforce rubber as much or greater than channel black, the ultimate purpose being to increase the abrasive resistance of the rubber. In both the partial combustion and cracking processes, which are termed high yield processes, the cooling step of the gases after partial combustion or cracking takes place a relatively long time after the partial combustion or cracking of the gas and gives the carbon particles time to grow. The softer blacks do not possess the abrasive resistance qualities needed for the manufacture of rubber tires and hence are not to any appreciable extent used in this industry. Since the manufacture of rubber tires presents the largest market for carbon black, it is desirable to make a black adaptable for this industry and also to use a process which will give the highest yield of black.

The method herein disclosed is new and novel and entirely different from any of the other processes abovedescribed. It will be noted that in most methods for producing carbon black, sudden cooling is important to control particle size and structure. In the method herein disclosed, this sudden or shock cooling is accomplished by bringing the gas to be reformed either in direct contact with a flame in a retort immersed in water or in any other acceptable cooling medium, or by bringing the gas to be cracked into direct contact with an incandescent surface produced by combusting a pre-mixed gas and air mixture within the structure of a porous diaphragm, the surface of which will not only become incandescent but will also emit hot products of combustion of sufficiently high temperature to also assist in the cracking of raw gas admitted into the burner compartment. The fundamental new and novel idea of both the above described production burners lies in the fact that in both cases the burner is immersed in a liquid and shock cooling is effected immediately upon production of the carbon with no chance for the balling action to take place among the particles.

The intensity of the cracking temperature-length of contact period for cracking, also temperature of cooling medium and thereby temperature of the cracked products are all a matter of proper equipment design, construction, control and operation.

An object of the invention is to produce carbon by a method which will inherently produce greater yields than is now produced by the channel process.

A still further object of the invention is to produce carbon black by a method which will produce carbon black of an acceptable grain structure.

It is a still further object of the invention to produce carbon black of an acceptable grain structure by the sudden or shock cooling of the products of combustion or cracking immediately after these products leave the burner or cracking means.

With these and other objects in view the invention comprises the process described and set forth in the following specification and claims.

The various features of the invention are illustrated in the accompanying drawings in which:

Figure 2 is a vertical cross-sectional view showing a modified form of burner with shock cooling, to be used in present installations;

Figure 3 is a vertical cross-sectional view showing the burner of Figure 1 more in detail;

Figure 4 is a vertical cross-sectional view showing modified type of burner.

Figure 1:
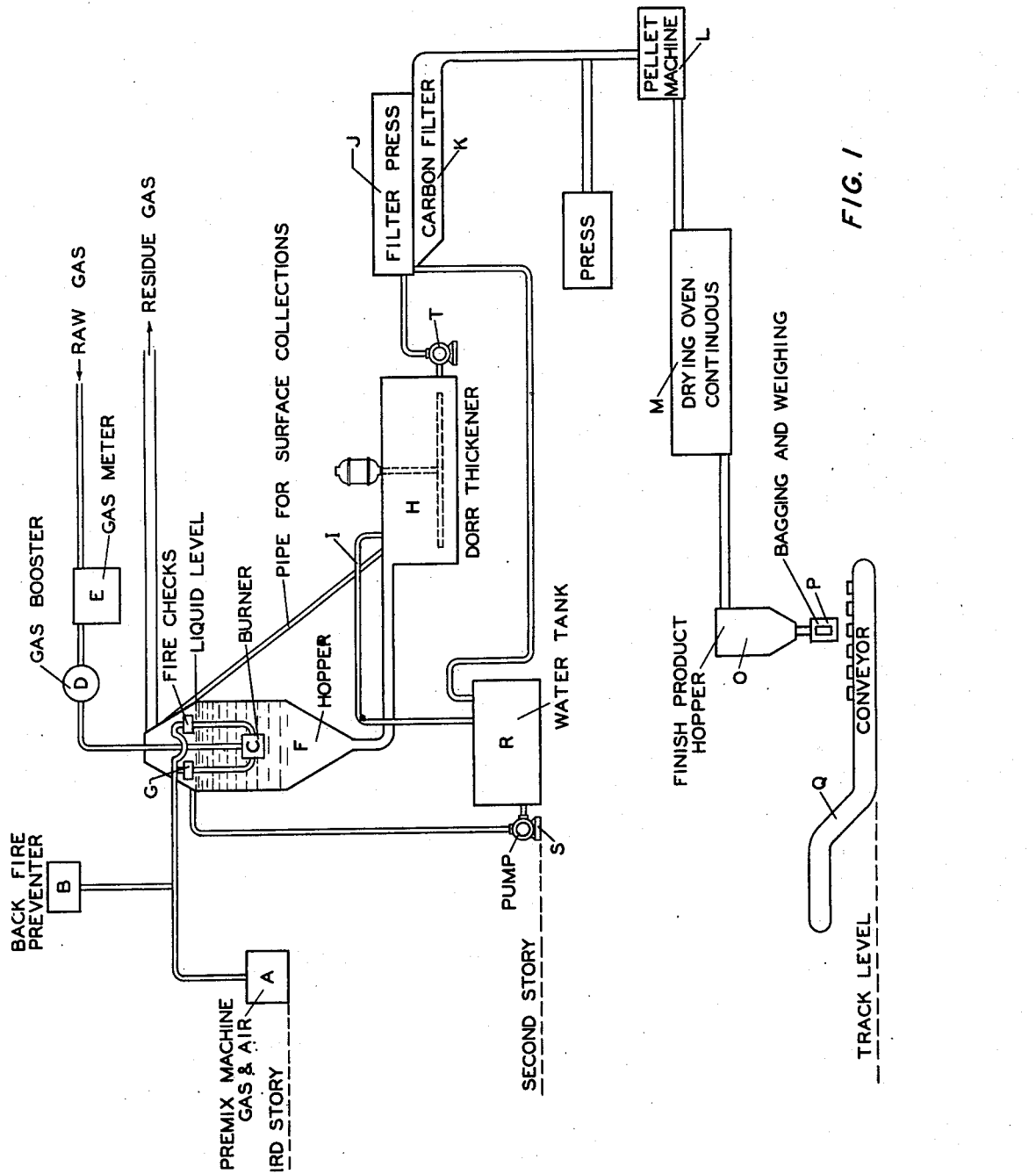
Figure 1 is a diagrammatic view of an apparatus or plant for producing carbon black, collecting, bagging and conveying the same to storage.

In the present invention, Figure 1 is a schematic sketch of one method of accomplishing the production, recovery and handling of the carbon black in the process of manufacture. The natural gas to be used for fuel is brought into a pre-mixing machine A, such as a "Kemp" or "Selas," where the proper proportion of air is pre-mixed with gas for perfect combustion and this ratio is automatically maintained. This explosive mixture is taken to the burner C which is immersed in the tank F containing either water or any other acceptable liquid. The pre-mixing machine A is protected against an explosion or backfire by fire checks G and also by a backfire preventer B of the soft head and fusible link type. The depth of immersion of the burner C is limited by the pressure generated in the pre-mixed gas and air in the pre-mixed machine A. In other words, the burner C cannot be immersed to a greater depth than the static head back pressure of the liquid at the gas discharge opening of the retort C. The burner is lighted and adjusted to the proper depth in the liquid and then raw gas is admitted to the combustion or cracking chamber within the retort C. The raw gas first passes through the meter E and then through the booster D before passing into the retort C. The gas booster D will be controlled and operated at the same or approximately the same pressure as the pre-mixed gas and air furnished by the pre-mixed machine A. When the raw natural gas comes in contact with the incandescent surfaces or in contact with the direct flame of the other type burners shown, the raw gas will be broken down to carbon and other residual gases. These gases will be forced out of the burner by both the pressure of the two gas boosting machines and also by direct expansion because of temperature. The period of contact and intensity of cracking will depend on temperature inside the retort-area of contact surfaces—quality of pre-mixed fuel gas being consumed in retort for heating, also quality, pressure and velocity of gas to be processed passing through retort. These factors may be varied to produce a desired cracked gas for different quality carbon black and/or other chemical compounds. These gases coming out of the burner C will carry the carbon which will be deposited in the water or liquid in the tank F. The residual gases will be washed free of their carbon, will bubble to the surface and there be collected in the hood over tank F. These residual gases are carried to a stack, or if they have any further value, will be taken to processes where they can be used. It is to be noted at this point that the hot residue gases with the carbon therein upon leaving the burner immediately contact the water in tank F and are cooled which leaves no opportunity for the carbon particles to ball together. The carbon black thus formed has a very hard grain structure and is very adaptable for mixing with rubber used in the manufacture of automobile tires.

The carbon black in tank F may settle in the hopper bottom of the tank or float to the surface. It can be periodically washed into a Dorr thickener H, such as used in mining operations. The overflow water from the Dorr thickener will go into a make-up water tank R from whence it will be returned by a pump S to the tank F. The liquid level in tank F is automatically controlled by well known float and valve mechanisms and no claim is made to this particular feature. The sludge which will settle to the bottom of the Dorr thickener will be conducted by a sludge pump T to a filter press J where a partially dry filter cake of carbon will be produced by the common method of filter pressing. This carbon black filter cake will then be conducted by gravity to a pellet machine L and to a conventional drying oven of continuous type M; thence through a conveyor N to a finished product hopper O. From this hopper the finished product will be fed by gravity to an automatic weighing and packing machine P which will operate on a pan type conveyor Q instead of on the conventional scale as is used in most carbon black plants. The finished package will be conveyed on this conveyor Q, the pans of which will also act as scale platform pans to a loading dock or to storage. From the loading dock the products will be put into regular railroad cars.

The idea of using a pan conveyor instead of handling the finished product in bags on push trucks is also new and novel in carbon black plants. It will be noted that a plant as set forth can be built on three levels and the product handled by gravity down to the packing room. The process is entirely different from any that has been used up to this time as the combustion or cracking, either of which may be used, takes place directly in the cooling medium. Furthermore, the water vapor and condensable hydrocarbons of the combustion (gas-air mixture) will condense when they come into contact with the cooling medium and the evaporation of the cooling water will be wholly or partially supplied by this condensation. The residue gases from the process will be washed and will be relatively dry as they will only be saturated at the temperature of the gases leaving the cooling medium. If any other cooling medium is used, such as a hydrocarbon, the water condensed out of the combustion gases will settle with the carbon and be drawn from the bottom of the tank, or if miscible may be separated by distillation or other means. Many other chemical baths in tank F can be used and treatment effected at the same time the carbon black is washed out of the gases.

Furthermore, in the production of carbon black by partial combustion or by cracking it is known that hydrocarbon compounds are formed. This invention also anticipates the use of this process for the production of these products as well as for the production of carbon black. These products can be recovered by regular distillation apparatus installed at the outlet of the tank F or at any other point in the system most advantageously to recover the products desired. The process can be used to primarily produce any other products than carbon black which can be produced by cracking or partial combustion of either gaseous or liquid raw material. The process may be used for partial cooling only, and the final separation effected by regular methods such as the bag house or Cottrell precipitation methods or a combination of both.

Figure 2 shows a sketch of another possible application of shock cooling which apparatus is adaptable to be used with processes now operated, such as the "Gastex" and "Thermatomic." The pre-mixed gas and air in proper proportions are fed into the retort or furnace 3 through the line 2 and are burned to supply the heat for the furnace. The raw gas comes into the furnace through line 1 and after being cracked or reformed in the furnace 3 passes through line 4 along with the gases from combustion to tank 5 which is adjacent the furnace 3. The cracked or reformed gas is discharged from line 4 into the water in tank 5 and shock cooled. The residue gases pass out through the stack 6 in the same manner as previously described and the carbon black drops into the hopper at the bottom of the tank 5 and passes through the line 7 to the Dorr thickener or still and is processed as previously set forth.

In the case of the regenerative type furnaces, each furnace would be connected into shock tank 5.

Figure 3 shows another type burner having the lines 10 and 11 conducting the pre-mixed gas and air into the side walls of the retort 13. The line 12 conducts the raw natural or other gas into the retort 13 through the middle thereof and the products of combustion and the carbon black leave through the opening 14. The lines 10 and 11 have the fire checks 15 and 16 located therein to protect the same against explosion or backfire. The retort 13 has a passage 17 running through the center thereof defined by the Alundum plate or infusorial brick diaphragm 18. The pre-mix gas and air conduits 10 and 11 discharge into the space 19 in the retort 13, where it is burned to heat the Alundum plate or infusorial brick, thus bringing the raw natural gas into direct contact with the incandescent surface of the plate or brick to thus crack the raw gas. The surface will not only become incandescent but will also emit the hot products of combustion which will be of sufficiently high temperature to also assist in the cracking of the raw gas admitted into the channel 17 in the retort. The pressure of the gas and air mixture, and the raw gas is sufficient to drive a flame into the water for a short distance before the flame is extinguished and the products of combustion and carbon black are cooled.

Figure 4 shows a modified type of burner having a pre-mix gas and air conduit 20 discharging into the retort 23. The conduit 20 has a suitable fire check means 22 mounted therein to insure against explosion or back fire. Within the retort 23 and at the upper end thereof is the burner 24 where the gas and air is burned. Line 21 brings the raw natural gas into the side wall of the retort 23 in the vicinity of the burner flame. The gas from combustion and the raw natural gas unite and flow around a series of baffles 25 and are finally discharged from the opening 26. The raw natural gas has a relatively long tortuous path between the baffles and plenty of time for the cracking action of the gas to be completed. The gases of combustion and carbon black pass through the opening 26 into the water where they are cooled and processed in the manner described in Figure 1.

Having thus described my invention, what I desire to secure by Letters Patent is:

1. The process of producing carbon black which comprises premixing a combustible mixture of gas and air, burning said premixed gas and air mixture wherein the combustion takes place beneath the surface of a body of water, introducing hydrocarbon gas into the flame of the burning premixed gas and air under such conditions as to cause cracking of the hydrocarbon gas, said products of combustion and cracked hydrocarbon products being immediately shock cooled upon leaving the flame of the burning premixed gas and air by passing into the body of water, separating the products of combustion and carbon black from the water by allowing the residual gas to bubble up through the water and then separating the carbon black from the water.

2. The process of producing carbon black which comprises premixing a combustible mixture of gas and air, burning said premixed gas and air mixture wherein the combustion takes place beneath the surface of a body of water, introducing hydrocarbon gas into the flame of the burning premixed gas and air under such conditions as to cause cracking of the hydrocarbon gas, said products of combustion and cracked hydrocarbon products being immediately shock cooled upon leaving the flame of the burned premixed gas and air by passing into the body of water, separating the products of combustion and carbon black from the water by allowing the residual gas to bubble up through the water and collecting the same, and then separating the carbon black from the water by filtering and returning the liquid to the process for further cooling purposes.

FREDERICK J. HARLOW.